United States Patent Office 3,272,756
Patented Sept. 13, 1966

3,272,756
RADIOACTIVE WASTE DISPOSAL USING COLEMANITE
John D. Kaser, Richland, Wash., assignor to the United States of America as represented by the United States Atomic Energy Commission
No Drawing. Filed Aug. 31, 1965, Ser. No. 484,136
2 Claims. (Cl. 252—301.1)

The invention herein described was made in the course of, or under, a contract with the U.S. Atomic Energy Commission.

This invention relates to an improvement in the spray calcination of radioactive waste solutions, specifically the use of colemanite as an additive to the feed.

The chemical processing of nuclear fuels results in the production of waste solutions containing highly radioactive fission products, as well as non-radioactive materials. The two principal processes in use at present are the Redox process, which involves the extraction with a ketone and the use of large amounts of aluminum nitrate as a salting-out agent, and the Purex process, which involves the use of an organic phosphate solvent in a strong nitric acid solution, the nitric acid constituting the salting-out agent. The conventional method of disposal in the past has involved storage of the liquid wastes in large stainless steel tanks.

Processes have been developed for the reduction of the wastes to solids by spray calcination. Such processes are described in U.S. Patent No. 3,008,904, granted November 14, 1961, to Benjamin M. Johnson and Gerald B. Barton. They are also described in U.S. Atomic Energy Commission report HW–65806, part 1, "Radiant Heat Spray Calcination Process for the Solid Fixation of Radioactive Wastes." The spray calcination involves spraying the feed into the top of a column having heated walls. The solids, steam, and gases formed by the decomposition of the waste are drawn off through the bottom of the column.

The feed may be exposed directly to the heated walls as disclosed in HW–65806, part 1. Alternatively the feed may be shielded from the heated wall by an unheated "draft tube," which is concentric with but spaced from the heated wall and also spaced from both the top and the bottom of the column so that gas may circulate around it. Such an apparatus is shown in U.S. Patent No. 3,191,662, granted June 29, 1965, to K. J. Schneider.

The solids produced are finely divided and bulky and have poor thermal conductivity. Since it is desirable that the wastes occupy the smallest possible volume and that, because of their self-heating character they have high thermal conductivity, it is desirable to melt and cast the solids in a container following their calcination. This step is also disclosed in HW–65806.

Difficulties in applying the above process arise from the properties of the calcine. The calcine from untreated waste does not completely melt at any temperature below 1100° C. but partially melts and sinters. Waste of lower melting point, e.g., caustic neutralized waste, of high sodium content, is often sticky over a range of several hundred degrees centigrade and tends to adhere to the walls of the calciner.

While the cast material is stored in sealed containers, the extremely high radioactivity of some of the constituents makes it desirable that it be resistant to attack by water in the event of rupture of the container. The calcined waste, per se, forms a mass on heating which readily disintegrates into a mud in water.

In order to reduce the problems relative to materials of construction, it is desirable that the melting point of the solids be kept below 1000° C. As also disclosed in HW–65806, the melting point of the calcine can be controlled to a considerable extent by the use of various additives, including sodium tetraborate. The borate ion of this compound combines with the cations of the feed to form a "borate glass." The addition of borate is also disclosed in Patent No. 3,008,904.

The use of borate has, however, given rise to problems. The gas is separated from the solids by gravity separation followed by filtration. When sodium tetraborate is employed in the feed, the filters become plugged very rapidly. The reason for this phenomenon is not understood but is believed to result from the formation of some volatile compound which precipitates in the filters.

I have found that the problems discussed above can be largely eliminated by the addition to the calciner feed of finely divided colemanite. The pure mineral, colemanite, has the formula $2CaO \cdot 3B_2O_3 \cdot 5H_2O$. Commercially, however, the product sold as colemanite often includes a proportion of ulexite, $NaCaB_5O_9$.

Typical compositions by weight of the commercial materials are:

|  | A | B |
|---|---|---|
| $B_2O_3$ | 32.4 | 42.52 |
| $Na_2O$ | 5.4 |  |
| $CaO$ | 17.2 | 26.15 |
| Insolubles | 17.3 |  |
| $SiO_2$ |  | 5.25 |
| $Al_2O_3$ |  | 2.03 |
| $H_2O$ | 27.7 | 20.33 |
| $CO_2$ |  | 1.98 |
|  | 100.0 | 98.26 |

By the term "colemanite," I include both the pure mineral and the commercial material.

By the addition of colemanite in suitable proportions, several advantages are secured. The melting point of the calcine is kept below 1000° C.; the stickiness of the calcine in the temperature range of 600 to 750° C. is eliminated; and the plugging of the filters, referred to above, is also eliminated. When the solids resulting from the spray calcination of the product including colemanite are melted and solidified, they form a relatively strong and insoluble glassy mass which does not disintegrate in water.

In order to secure the above advantages to the fullest extent, the ratio of the colemanite to the total calcined waste solids should be at least 70 to 30. The colemanite has a melting point of about 800° C., which is in the desired range, and does not become sticky at the calcination temperatures. Its proportion can therefore be increased without limit, so far as the treatment is concerned. The volume of material to be stored of course increases with the amount of colemanite. With some very refractory wastes, the use of high ratios, e.g., 90:10 may be desirable. Moreover, reasonably satisfactory results may be secured with less than the preferred amount of colemanite, the lower limit of the colemanite-calcined waste solids ratio being about 40:60. These lower ratios result in higher melting points. For example, a mixture of 47% colemanite and 53% calcined Purex waste was found to have a fusion temperature of 950° C., while a mixture of 78% colemanite and 22% calcined Purex waste had a fusion temperature of 800° C.

The temperature of the walls of the spray calciner is preferably maintained in the range 700–750° C. to secure proper calcination and, at the same time, avoid sticking on the walls. Reasonably satisfactory results may, however, be secured with wall temperatures as low as 600° C., the calcination being completed during the melting step. The feed rate should be controlled so that the minimum temperature at the axis in the calciner is at least 300° C.

The calciner feed is prepared by forming a slurry of finely divided colemanite in the feed solution. I have successfully employed colemanite which is 95% less than 325 mesh. The mixture is most satisfactorily produced by slurrying the colemanite in sufficient acid to form a readily flowable mixture and mixing this slurry with the waste solution. The colemanite disperses most readily in a strongly acid solution.

The following examples show the application of the process to simulated Purex and Redox wastes:

EXAMPLE 1.—SIMULATED PUREX WASTE

A non-radioactive solution simulating the Purex waste was made up, having the composition shown in Table I.

Table I

| Component: | Molarity |
|---|---|
| $H^+$ ($H^+$ added, neutralization not accounted for) | 0.107 |
| $Na^+$ | 0.20 |
| $Fe^{+3}$ | 0.0595 |
| $Al^{+3}$ | 0.0225 |
| $Cr^{+3}$ | 0.009 |
| $Ni^{+2}$ | 0.0045 |
| $Hg^{+2}$ (as oxide) | 0.0003 |
| $NO_3^-$ | 0.613 |
| $SiO_2$ | 0.00285 |
| $PO_4^{-3}$ | 0.00225 |
| $ZrO^{+2}$ | 0.0105 |
| $Mo_7O_{24}^{-6}$ | 0.00175 |
| $(Y+R.E.)^{3.25+}$ (as oxide) | 0.00225 |
| $NH_4^+$ | 0.0105 |
| $K^+$ | 0.007 |
| $Ca^{+2}$ | 0.0055 |
| $CO_3^{-2}$ | 0.0035 |
| Additive (colemanite) g./liter | 86.7 |

NOTE.—This amount of colemanite contained about three times enough carbonate to neutralize the $H^+$, so the feed ended up neutral pH 7. "R.E." designates mixed rare earths.

This mixture gives a ratio by weight of colemanite to calcined waste solids of about 75:25.

The feed was sprayed into the upper end of a 14 inch diameter calciner, 6 feet high, having no draft tube, the walls of which were maintained at about 650° C. The feed rate was 3.9 gallons per hour. The minimum internal temperature at the center of the calciner was about 300° C. The calcined product was discharged through a continuous induction heated melter. The walls of the melter were maintained in the temperature range 950° C.–1000° C. The molten material discharged in the range 850° C.–950° C. It was discharged into receptacles and allowed to cool. The product was a glassy solid having a melting point of about 800° C.

EXAMPLE 2.—SIMULATED REDOX WASTE

A non-radioactive solution was prepared simulating the Redox waste. The composition is shown in Table II.

Table II

| Component: | Molarity |
|---|---|
| $Al^{+3}$ | 0.777 |
| $H^+$ (added; neutralization not accounted for) | 0.106 |
| $Na^+$ | 0.981 |
| $Fe^{+3}$ | 0.027 |
| $Cr_2O_7^{-2}$ | 0.0053 |
| $Cr^{+3}$ | 0.00053 |
| $NH_4^+$ | 0.0143 |
| $SO_4^{-2}$ | 0.0106 |
| $NO_3^-$ | 3.48 |
| Additive ($SiO_2$) (added as glass former; probably was not necessary) | 0.55 |
| Colemanite g./liter | 182.6 |

The mixture was sprayed into the top of an 18 inch diameter calciner, 8.5 feet high, having no draft tube, the walls of which were heated to about 600° C. The feed rate was 7.3 gallons per hour and the minimum temperature in the center of the calciner was about 300° C.

The product was discharged from the bottom of the calciner into a warmed pot. It was a yellow powder which melted to a glass at about 1000° C.

This mixture gives a ratio of colemanite to calcined waste solids of about 55:45 and of combined colemanite and silica to calcined waste solids of about 59:41.

The embodiments of the invention in which an exclusive property or privilege is claimed are defined as follows:

1. A process for treating waste liquids resulting from the chemical reprocessing of irradiated nuclear fuel which comprises:
  (a) adding finely divided colemanite to said waste liquid, thereby forming a slurry;
  (b) subjecting said slurry to spray calcination at a wall temperature in the range 600° C. to 750° C., thereby forming a finely divided solid residue and waste gases; and
  (c) separating said solid residue from said gases; the amount of colemanite being sufficient to form with the calcined constituents of said waste, a product having a melting point of less than 1000° C.

2. The process as defined in claim 1 and further comprising the steps of
  (d) melting said solid residue; and
  (e) casting the molten residue in a container.

References Cited by the Examiner

UNITED STATES PATENTS 3,008,904 11/1961 Johnson et al. _____ 252—301.1
3,120,493 2/1964 Clark et al. _____ 252—301.1
3,213,031 10/1965 Heinemann et al. ____ 252—301.1

FOREIGN PATENTS 871,336 6/1961 Great Britain.

References Cited by the Applicant

French: Colemanite as Glaze Material, Journal of the American Ceramic Society, vol. 14, pp. 739–741 (1931).

BENJAMIN R. PADGETT, *Acting Primary Examiner.*

S. J. LECHERT, *Assistant Examiner.*